UNITED STATES PATENT OFFICE 2,427,315

CARBOXY POLYMETHYLENE GUANAMINES

Jack Theo Thurston, Cos Cob, Conn., assignor to American Cyanamid Company, New York, N. Y., a corporation of Maine No Drawing. Application August 30, 1941, Serial No. 409,131

4 Claims. (Cl. 260—249.5)

This invention relates to guanamines in which the 2-carbon atom of the 4,6-diamino-1,3,5-triazine ring contains as the substituent group a carboxy polymethylene radical which may be either a straight chain or an alicyclic ring.

The guanamines of the present invention are of particular significance as they react with formaldehyde to form resins which are soluble in aqueous alkaline media and can be applied as textile finishes which on curing by heat are transformed from a water-soluble to a water-insoluble form and when incorporated with other aldehyde resin-forming compounds having hydrophobic groups, they serve as water-repellents for textiles and paper. An important characteristic of these finishes is that the water-repellency is effected without objectionable stiffening of the goods. In other words, the finish does not form a continuous film from fiber to fiber.

The products of the present invention can be produced by various methods and the invention is not limited to any particular method of preparation. Two processes are, however, preferred because of their simplicity and cheapness. In one process a dibasic acid ester is combined with two moles of a biguanide, preferably in a solvent, and the product isolated as the biguanide salt or the ester of a carboxy guanamine depending on the proximity of the carbalkoxy group. By reacting an alkali metal salt of a half ester of a dibasic acid with a biguanide the alkali metal salt of the carboxy substituted guanamine is obtained.

The most important products of the present invention are the ones prepared from biguanide itself. In these products the amino groups of the triazine ring are unsubstituted and the products can be prepared with best yields and simplest procedures. However, the present invention also includes products prepared from substituted biguanides such as phenyl biguanide, allyl biguanide or dimethyl biguanide in which case the correspondingly substituted guanamines are obtained. When substituted biguanides are used the reaction does not proceed as rapidly and as completely and it is sometimes desirable to add a condensing agent such as a metal alkoxide to facilitate the reaction. The products derived from unsubstituted biguanide can usually be prepared without condensing agents but in some cases it may be desirable to accelerate the reaction by the use of a condensing agent.

In general the preferred process of the present invention operates best in the presence of a suitable solvent for the biguanide and/or the ester. I have found that the lower molecular weight alcohols are particularly effective as they are good solvents for biguanide. The cheap monohydric paraffin alcohols such as methanol and ethanol operate well and are of particular advantage because the most readily available esters of the carboxylic acids are usually the methyl and ethyl esters, and if the alcohol which is used as a solvent corresponds to the alcohol radical of the ester, no separation problem arises. Excellent results are, however, obtained with the lower monohydric alcohols such as the ether alcohols, for example, the ethyl ether of ethylene glycol.

The invention will be described in greater detail in conjunction with the following specific examples which are typical illustrations. The parts are by weight.

Example 1

Malonoguanamine

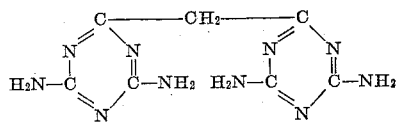

and

Carboxyacetoguanamine

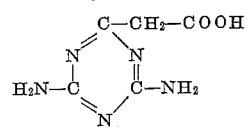

One hundred and twenty-five parts of ethyl malonate were added to 202 parts of biguanide dissolved in 1000 parts of methanol. Within an hour a product began to precipitate from the solution and was aided by agitation. This insoluble product, which was malonoguanamine was obtained by filtration in a yield of about 5%. The filtrate containing the biguanide salt of carboxyacetoguanamine was acidified to a pH of about 4 in order to precipitate the free guanamine which was obtained in a yield of about 80%.

Example 2

Succinoguanamine

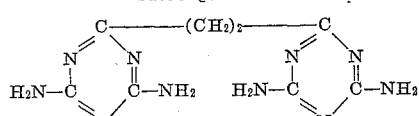

and

β-carbomethoxypropionoguanamine

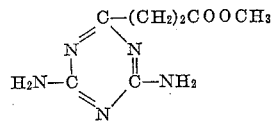

Two hundred nine parts of ethyl succinate were added to 101 parts of biguanide dissolved in 400 parts of warm methanol. Within a few minutes the product began to precipitate from the solution and after standing overnight the product was filtered and washed with methanol. This material was then extracted with about 300 parts of hot ethanol, which dissolved the β-carbomethoxypropionoguanamine melting at 159° C. The residue left from the alcohol extraction was succinoguanamine melting above 335° C., which could be further purified by dissolving in warm dilute hydrochloric acid solution, followed by precipitation with ammonium hydroxide. When the amount of biguanide was doubled the succinoguanamine was obtained in about 75% yield and the mono-guanamine was absent.

Example 3

ω-carboxypelargonoguanamine

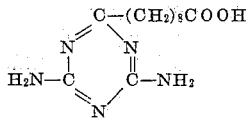

One hundred parts of biguanide were added to 280 parts of sodium butyl sebacate dispersed in about 1200 parts of methanol warmed to about 55–60° C. The reaction mixture was stirred at room temperature for about 24 hours. After filtering and washing with methanol, the sodium salt was dissolved in about 2500 parts of water, and filtered hot. The filtrate was acidified to a pH of about 4.0 and the precipitated ω-carboxypelargonoguanamine was extracted with alcohol in order to remove any sebacic acid. The yield of purified product melting at 223–225° C. was 75%.

Example 4

ω-carbobutoxypelargonoguanamine

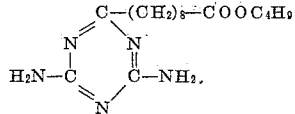

Twenty parts of ω-carboxypelargonoguanamine was dispersed in 200 parts of n-butanol containing 3.5 parts of sulfuric acid and refluxed for about a day in order to effect esterification. The reaction mixture was neutralized with sodium hydroxide and then extracted with water. After distilling the excess butanol and water, the remaining pasty mass was recrystallized from hot naphtha and then from alcohol by the addition of water until a slight turbidity resulted. The resulting parts of ω-carbobutoxypelargonoguanamine was a waxy solid melting at 90–92° C. and had a saponification equivalent of 323.

Example 5

β-carboxypropionoguanamine

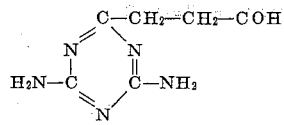

To 353 parts of biguanide dissolved in about 2500 parts of methanol containing 162 parts of sodium methoxide was added 462 parts of sodium methyl succinate. This reaction mixture was stirred for about one day even though precipitation appeared to be completed in about five to six hours. The insoluble product was removed by filtration and the methanol was concentrated to yield further product. This crude sodium β-carboxypropionoguanamine amounting to about 425 parts was dissolved in water, filtered in order to remove the small amount of insoluble material and then acidified to a pH of about 4.0. The precipitated β-carboxypropionoguanamine was filtered, washed with a large volume of water and then dried at 110° C. The yield of colorless and infusible product was 332 parts of 61%.

I claim:
1. A method of making salts of a carboxy polymethylene guanamines which comprises the steps of dissolving a biguanide and a salt of a half ester of a saturated dibasic acid in a common solvent whereby reaction between the components is instituted and a precipitate comprising the desired salt of the resulting carboxy polymethylene guanamine is formed, continuing the reaction until precipitation substantially ceases, and collecting the precipitated salt of the carboxy polymethylene guanamine.

2. A procedure according to claim 1 in which the biguanide is biguanide.

3. A procedure according to claim 1 in which the solvent is a lower monohydric paraffin alcohol.

4. A process of preparing guanamine polymethylene carboxylic acids which comprises the steps of dissolving a biguanide and a salt of a half ester of a saturated dibasic acid in a common solvent whereby reaction is initiated and precipitation is instituted, continuing the reaction until precipitation substantially ceases, collecting the resultant precipitate comprising the desired salt of the carboxy polymethylene guanamine, acidifying an aqueous solution of the salt whereby the free guanamine polymethylene carboxylic acid is liberated, and collecting the liberated guanamine polymethylene carboxylic acid.

JACK THEO THURSTON.